Sept. 1, 1936.　　　　　J. J. CHYLE　　　　　2,052,699
COVERED ELECTRODE FOR ARC WELDING
Filed March 21, 1932
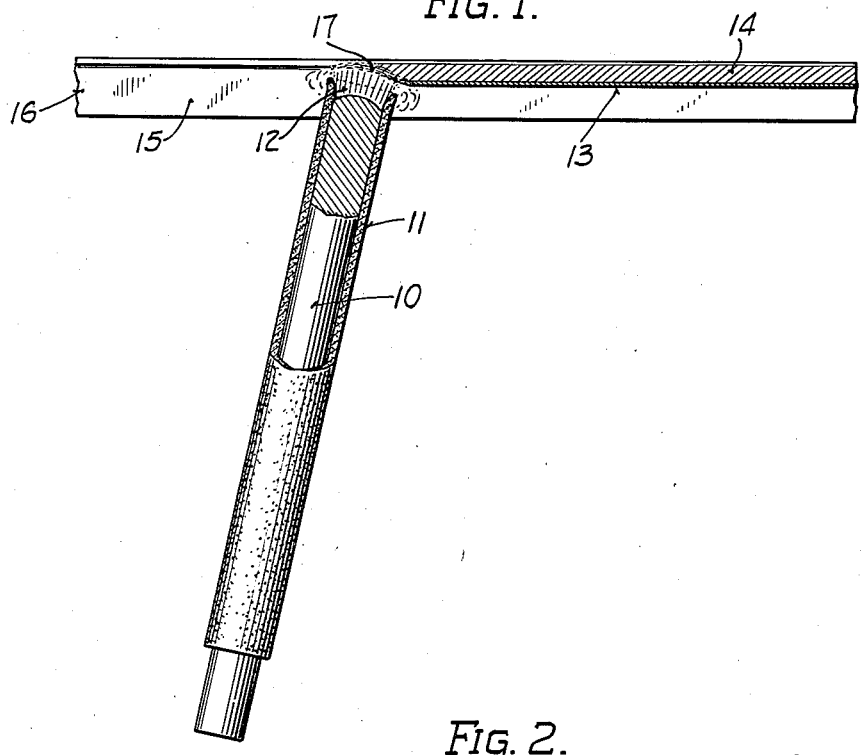
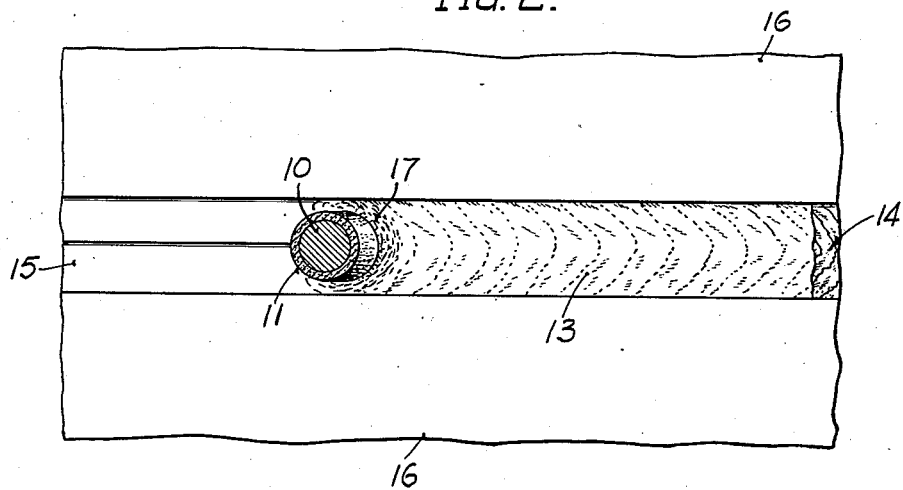
INVENTOR.
John J. Chyle
BY
ATTORNEY.

Patented Sept. 1, 1936

2,052,699

UNITED STATES PATENT OFFICE 2,052,699

COVERED ELECTRODE FOR ARC WELDING

John J. Chyle, Milwaukee, Wis., assignor to A. O. Smith Corporation, Milwaukee, Wis., a corporation of New York Application March 21, 1932, Serial No. 600,100

15 Claims. (Cl. 219—8)

The invention relates generally to covered electrodes for arc welding and more particularly to the composition of the coverings.

The object of the invention generally stated is to provide for depositing sound weld metal at a rate which will give a pool of weld metal of the proper consistency and volume to retain its shape when suspended or deposited on surfaces inclined to a horizontal plane, and form a uniform sound weld in any position.

Another object of the invention is to provide a covering for electrodes which, in the process of welding, decomposes when subjected to high temperatures into a liquid slag that spreads evenly over the deposited metal.

It is also an object of the invention to provide a covering for electrodes which, in the process of welding, will emit gases and form a crater at the end of the electrode for confining the emitted gases and decomposes into a slag that spreads evenly over the deposited weld metal and through which welding operations may be successfully carried on.

Other objects of the invention will in part be obvious and in part will appear hereinafter.

For a general understanding of the nature and objects of the invention, reference should be had to the following detailed description taken in conjunction with the accompanying drawing, in which:

Figure 1 is a view partly in section and partly in side elevation of a covered electrode showing the crater that is formed around the end of the metallic rod when the electrode is made in accordance with this invention and a layer of slag on the deposited metal; and Fig. 2 is a bottom plan view of a weld that has been deposited from an electrode made in accordance with this invention showing the slag spread evenly over the deposited metal.

Referring now to the drawing, a metallic rod 10 possessing the required characteristics and the desired dimensions is selected. Steel rods containing different percentages of carbon, chromium iron alloys, and many other alloys have been used in order to meet different welding conditions.

It has been found from experience in performing welding operations that in order to get proper penetration, the rod 10 must be provided with a covering 11 which, when subjected to the high temperatures of an arc, decomposes slowly, emitting large volumes of gas and forming a crater about the end of the rod 10, such as shown at 12. In the process of welding, this crater functions to direct the gases emitted by the decomposing covering downwardly forming an envelope of gases, which protects the metal in the arc stream from the atmosphere.

In selecting a material that will form a suitable crater and emit a sufficient volume of gases for forming a protective envelope, it has been found that some carbohydrate is preferable. There are many carbohydrates that are suitable for this purpose and the one which I prefer is wood flour which contains a large amount of cellulose. While wood flour has been selected, it will be readily appreciated that many of the other carbohydrates such as starch and cotton would be suitable.

Wood flour of itself cannot be applied to steel or alloy rods as a covering and some means of retaining it on the rod has to be provided. Heretofore sodium silicate has been used as a binder in electrode coverings. When wood flour and sodium silicate are mixed, they produce a mixture which may be readily applied to rods, such as 10, to provide a covering which, when dried, is tough and hard and which will not break off even when subjected to the rough handling often given covered electrodes.

A rod covered with a mixture of wood flour and sodium silicate has advantages. For example, the cellulose will, in the process of arc welding, emit a desired volume of gases to produce a protective envelope and will decompose slowly enough to produce a good crater. However, it has been found that the sodium silicate gives a slag which accumulates in areas only partly covering the molten metal.

This segregation of slag which forms from sodium silicate does not permit the deposited metal to solidify into a uniform even mass. Wherever the areas of slag are accumulated, holes or depressions in the metal are found. These holes or depressions are of varying sizes and shapes.

In using a weldrod covered with wood flour and sodium silicate for overhead or vertical seams, the slag formed is more injurious than in horizontal welding. The holes or depressions in the deposited metal are deeper and more frequent.

In order to produce a covering which decomposes by pyrolysis leaving a slag which is liquid at welding temperatures and will spread evenly over the surface, I mix with the cellulose and sodium silicate a quantity of titanium oxide. The ingredients of this mixture so decompose that, in the process of arc welding, a proper crater is formed. They also, in the process of welding, act to produce a slag in the nature of a solution which spreads evenly and uniformly over the deposited weld metal in a layer, through which a welder may deposit more weld metal without entrapping any deleterious matter.

In preparing the mixture for covering the rods, the cellulose, sodium silicate, and titanium oxide are mixed in proportions to give a plastic mass that may be readily applied to the steel and alloy rods by extrusion or other methods. A mixture which has been found very suitable comprises the following:

| | Parts by weight |
|---|---|
| Wood flour | about—13 |
| Sodium silicate | about—42 |
| Titanium oxide | about—12 to 16 |

It has been found that the amount of titanium oxide may be varied through a much greater range than 12 to 16 parts by weight and still produce beneficial results. My experimentation has revealed that good results are obtained when from 4 to 65 parts by weight of titanium oxide are mixed with wood flour and sodium silicate.

In order to obtain a plastic mass that may be applied readily to rods, water may be added to the mixture of wood flour, sodium silicate, and titanium oxide. The quantity of water added will depend on the conditions to be met. In some instances, water in quantities of about 6 parts by weight have been added to the preferred mixture described hereinbefore and a very desirable covering mass produced.

The sodium silicate used is preferably provided in the form of water glass and contains a large amount of water. It has been found that when water glass is used, very desirable mixtures for covering rods may be made without adding any extra water. In preparing the mixture without the use of water in addition to that contained in the sodium silicate, if the mass produced is too liquid to be applied to the rod, more wood flour may be added, while if it is not sufficiently plastic, more sodium silicate. In this manner, one or the other may be added until a mass of the proper plasticity is obtained.

Many different solutions of sodium silicate are available on the market, and many of these commercial solutions may be used in preparing a suitable covering. I have found that the solution which serves my purposes best includes about 3 parts by weight of silica ($SiO_2$) to 1 part by weight of sodium oxide ($Na_2O$).

The thickness of the covering applied to a rod will depend upon the welding conditions to be met. Methods of covering weldrods are well known and the satisfactory method for applying a covering such as this, is by extrusion. When applying covering by extrusion, the rod is moved through a nozzle through which the plastic mass is extruded under pressure. After the coating has been applied, the rod is allowed to dry and the covering becomes very tough and firm. The presence of the titanium oxide gives the covering a white appearance.

The electrodes, after they have been covered, may be dried in different ways. In some instances they are allowed to stand in the atmosphere and to dry slowly. When it is desired to dry them very quickly, ovens well known in the art may be utilized for driving off the moisture.

The proportions of the ingredients in the covering are changed when the electrode is dried. An analysis reveals that the wood flour and titanium oxide are present in substantially the same parts by weight as in the original mixture, but that a large amount of the water contained in the sodium silicate has evaporated.

Electrodes covered from a mixture of 13 parts by weight of wood flour, 12 parts by weight of titanium oxide, and 42 parts by weight of sodium silicate, were analyzed after they had been dried and the covering was found to contain 29% wood flour, 26.81% titanium oxide, 34.49% sodium silicate, and 5.25% moisture. This accounts for 95.55% of the covering. The other 4.45% included adventitious constituents such as .4% alumina, .6% magnesia, .5% potash, .7% iron, and .11% manganese. The remainder was water in combination with some of the ingredients.

The amount of alumina, magnesia, potash, iron, and manganese contained in the covering is substantially negligible and does not affect the functioning of the covering. The principal ingredients in the dry electrode covering are wood flour, titanium oxide, sodium silicate, and moisture.

In welding with covered electrodes comprising the ingredients set forth hereinbefore in the proportions specified, a sufficient volume of gas is emitted from the covering to provide a protecting envelope. A deep crater is formed at the end of the rod which functions to direct the gases substantially parallel to the arc stream.

The sodium silicate and the titanium oxide, when subjected to the welding temperatures, dissolve in one another forming a slag 13 which is in the nature of a solution and which quickly spreads over the deposited weld metal 14 in groove 15 formed by the scarfed edges of the plates 16 being welded. The layer of slag 13 is very thin and uniform and does not deleteriously affect the deposited weld metal 14. The result is that the weld metal solidifies into a uniform and even mass.

If the welding conditions to be met require that one layer of weld metal be superimposed upon another, the superimposing of the layers of weld metal may be readily effected without entrapping any of the slag. In other words, the layer of slag 13 is easily either penetrated or reduced to a solution again, in which condition it is forced to the surface of the deposited molten metal, forming a new layer of slag. However, in welding with this rod it is good practice to clean off each layer of slag before one layer of weld metal is superimposed on another.

In welding overhead seams or vertical seams with electrodes coated with this covering, good penetration is obtained. The pool of molten metal 17 formed is of the right size and consistency to retain its shape until it solidifies. In this manner overhead and vertical seams may be readily made which are uniform in shape and free from cavities and depressions.

The foregoing description discloses a covering for electrodes, the ingredients of which cooperate to produce a weld deposit of sound weld metal which does not flow so as to hang in drops which distort the weld when suspended or supported on a sloping wall and which solidifies into a uniform even mass. Further, the slag deposited is such that it does not in any way restrict the superimposing of as large a number of layers of weld metal as desired to meet welding conditions.

Since certain changes may be made in the above mixture, and different embodiments of the invention may be made without departing from the scope thereof, it is intended that all matter contained in the above description shall be interpreted as illustrative and not in a limiting sense.

Having set forth my invention, what I desire to secure by Letters Patent is:

1. A composition of matter for covering electrodes for arc welding comprising wood flour in the proportion of about 13 parts by weight, sodium silicate in about 42 parts by weight, the wood flour and sodium silicate being in quantities sufficient to give, in combination with titanium oxide in quantities of from 4 to 65 parts by weight, a plastic mass which will adhere to electrodes.

2. A composition of matter for covering electrodes for arc welding comprising about 13 parts by weight of wood flour, about 42 parts by weight of sodium silicate, 12 to 16 parts by weight titanium oxide, and 6 parts by weight of water, mixed into a plastic mass.

3. A composition of matter for covering electrodes for arc welding comprising from 4 to 65 parts by weight of titanium oxide mixed with about 13 parts by weight of wood flour and sodium silicate in the form of water glass in sufficient quantities to produce a plastic mass capable of adhering to electrodes.

4. A covered electrode comprising a metallic rod and a dried adherent layer of a composition of matter containing from 4 to 65 parts by weight of titanium oxide, about 13 parts by weight of cellulose, and sodium silicate in sufficient quantities to make a plastic mass that will adhere to the metallic rod during the drying process.

5. A covered electrode comprising a metallic rod and a dried adherent layer of a composition of matter containing at least 4 parts by weight of titanium oxide, about 13 parts by weight of cellulose, and sodium silicate and water in sufficient quantities to make a plastic mass that will adhere to the metallic rod.

6. A composition of matter for covering metallic electrodes for arc welding comprising a cellulosic material, sodium silicate, water, and titanium oxide in sufficient quantities to combine with the sodium silicate to form a slag in the nature of a solution during welding, the quantity of titanium oxide being at least 4 parts by weight, the wood flour about 13 parts by weight, and the other ingredients being added in sufficient quantities to form a plastic mass.

7. A composition of matter for covering metallic electrodes for arc welding comprising wood flour, sodium silicate, water, and titanium oxide, the quantity of titanium oxide and wood flour being provided in the proportion of 12:13, the ingredients being mixed in sufficient quantities to produce a plastic mass capable of adhering to metallic electrodes, and the titanium oxide being utilized to combine with the sodium silicate to form, when the composition of matter is subjected to the temperatures produced by arc welding, a slag which appears in the form of a solution.

8. A covered electrode for arc welding comprising a metallic rod, about 13 parts by weight of wood flour, about 42 parts by weight of sodium silicate, about 6 parts by weight of water, and about 12 parts by weight of titanium oxide mixed into a plastic mass and a layer applied to the metallic rod to form a covering and dried.

9. A covered electrode for arc welding comprising a metallic rod, a covering applied to the rod, said covering including a carbohydrate, sodium silicate and titanium oxide in sufficient quantities to combine with the sodium silicate to form a slag in the nature of a solution during welding, the quantity of titanium oxide to the carbohydrate being at least 4 parts by weight to 13 parts by weight.

10. A covered electrode comprising a metallic rod, and a covering containing wood flour, titanium oxide, sodium silicate, in about the proportion of 29 to 26.81 to 34.49.

11. A covered electrode comprising a metallic rod, and a covering which contains wood flour, sodium silicate, and titanium oxide, said covering being a mass such as that which can be formed by applying a plastic mixture which comprises about 13 parts by weight of wood flour, about 12 parts by weight of titanium oxide, and about 42 parts by weight of sodium silicate, and dried to form a tough adherent mass.

12. A covered electrode comprising a metallic rod and an adherent layer of a composition of matter containing at least 4 parts by weight of titanium oxide, about 13 parts by weight of wood flour, and sodium silicate and water in sufficient quantities to form a plastic mass, dried to form a tough adherent covering.

13. A composition of matter for covering electrodes for arc welding, comprising 4 to 65 parts by weight of titanium oxide mixed with about 13 parts by weight of cellulose, and sodium silicate and water added in sufficient quantities to form a plastic mass capable of adhering to the electrodes.

14. A metal electrode for arc welding comprising a metal rod and a heavy covering therefor, the latter containing as its principal constituents a reducing agent, sodium silicate, and one of a group of materials consisting of titanium oxide and titanium providing material which is capable of forming titanium oxide in the presence of the gases produced by the decomposition of the covering and at the arc temperature, said titanium oxide being in sufficient quantities to produce with the slag forming silicate a thin even layer of slag over the deposited weld metal suitable for use in welding overhead.

15. A covered electrode for electric arc welding, comprising a metallic rod and a dried adherent layer of a composition of matter containing at least 4 parts by weight of titanium oxide or an equivalent titanium providing material, about 13 parts by weight of a carbohydrate or equivalent reducing material, and sodium silicate and water in sufficient quantities to make a plastic mass that will adhere to the metallic rod.

JOHN J. CHYLE.